US 8,156,179 B2

(12) United States Patent
Parmar et al.

(10) Patent No.: US 8,156,179 B2
(45) Date of Patent: Apr. 10, 2012

(54) GRID-ENABLED, SERVICE-ORIENTED ARCHITECTURE FOR ENABLING HIGH-SPEED COMPUTING APPLICATIONS

(75) Inventors: Onkar S. Parmar, Markham (CA); Yonggang Hu, Richmond Hill (CA)

(73) Assignee: Platform Computing Corporation, Markham, Ontario (CA)

( * ) Notice: Subject to any disclaimer, the term of this patent is extended or adjusted under 35 U.S.C. 154(b) by 289 days.

(21) Appl. No.: 11/740,863

(22) Filed: Apr. 26, 2007

(65) Prior Publication Data
US 2008/0270523 A1 Oct. 30, 2008

(51) Int. Cl.
*G06F 15/16* (2006.01)
*G06F 15/173* (2006.01)
*G06F 3/00* (2006.01)
*H04L 12/28* (2006.01)
*G10L 19/00* (2006.01)

(52) U.S. Cl. ........ 709/203; 709/226; 709/219; 370/389; 719/328; 704/213

(58) Field of Classification Search .......... 709/217–229, 709/101; 370/389; 719/328; 704/213
See application file for complete search history.

(56) References Cited

U.S. PATENT DOCUMENTS

| 4,545,065 | A | * | 10/1985 | Visser | 704/213 |
| 6,834,297 | B1 | * | 12/2004 | Peiffer et al. | 709/219 |
| 2002/0194244 | A1 | * | 12/2002 | Raventos | 709/101 |
| 2006/0112400 | A1 | * | 5/2006 | Zhang et al. | 719/328 |
| 2006/0277305 | A1 | * | 12/2006 | Bernardin et al. | 709/226 |
| 2006/0277307 | A1 | | 12/2006 | Bernardin et al. | |
| 2008/0031242 | A1 | * | 2/2008 | Gits et al. | 370/389 |

* cited by examiner

*Primary Examiner* — Ian N Moore
*Assistant Examiner* — Kiet Tang
(74) *Attorney, Agent, or Firm* — Baker & McKenzie LLP

(57) ABSTRACT

Disclosed herein are systems and methods for a distributed computing system having a service-oriented architecture. The system is configured to receive workloads from client applications and to execute workloads on service hosts. The distributed computing system dynamically assigns the workloads to the applications running on the service hosts, with the workloads being assigned according to the service needs and the availability of service hosts and other resources on the system. The presently disclosed systems and methods provide for high-throughput communications through an asynchronous binary or a synchronous binary communications protocol. Further disclosed embodiments include flexible failover and upgrade techniques, isolation between execution users of the system, virtualization through mobility and the ability to grow and shrink assigned resources, and for a software development kit adapted for the present architecture.

27 Claims, 9 Drawing Sheets

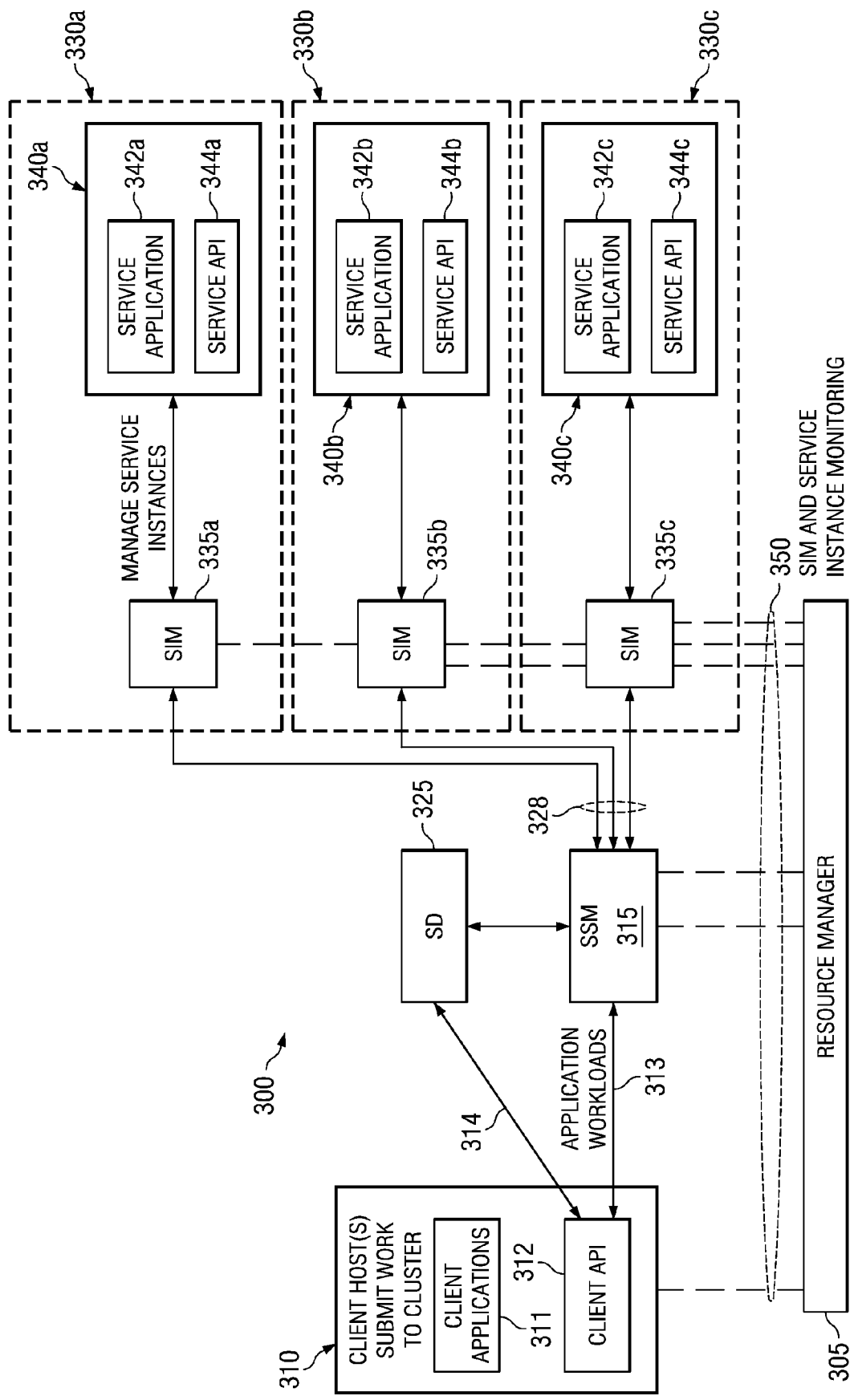

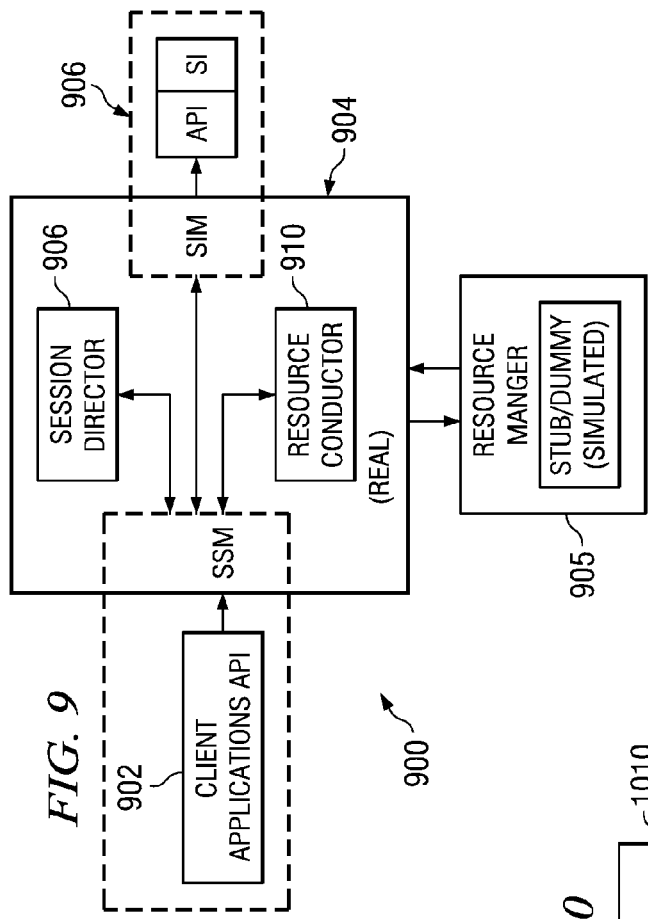
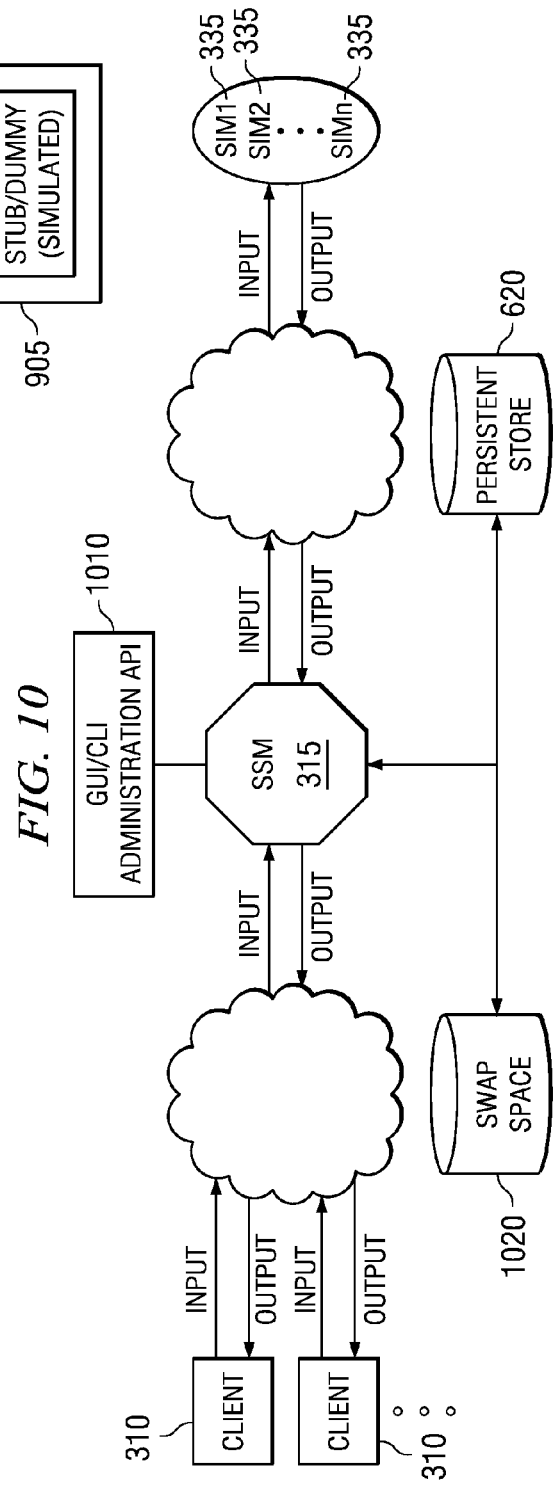

GRID-ENABLED, SERVICE-ORIENTED ARCHITECTURE FOR ENABLING HIGH-SPEED COMPUTING APPLICATIONS

TECHNICAL FIELD

Disclosed embodiments herein relate generally to grid-enabled systems for high-speed computing applications, and more specifically to such architectures in the context of service-oriented architectures. Such architectures provide for "virtualization" of applications such that applications can be dynamically and flexibly assigned to various resources available on the distributed computing network.

BACKGROUND

Service-oriented architectures are architectures that make computing services available as independent services that can be accessed without knowledge of their underlying platform implementations. Prior-art service-oriented architectures provide the resources to the applications through network-based protocols, which are text-/web-based protocols such as are commonly used for Internet-based communications. Common network protocols of this type include HTTP, HTTPS, SOAP, WSDL, and UDDI. These various protocols may perform one or more functions for the network communications protocols, but the common root of these protocols is that they are a part of, rely on, or otherwise use web-/text-based communications. Further, the prior-art network communications protocols used are typically implemented through synchronous SOAP/HTTP communications signaling pathways.

Another prior-art approach includes a service broker, which is provided within a network to distribute application workloads from network clients to be run as service instances on the network resources. As with the other prior-art approach, this approach has suffered from the limitations of using text-based/web-based communications protocols for communicating between the client, the broker, and the service instances.

This prior-art approach also is limited in that it uses a pull-based access protocol to determine the statuses of the available service instances, whereby the service instances will notify the broker that they have additional capacity for processing jobs from the client. The difficulty with the pull-based approach is that it can introduce latency in the roundtrip job processing time. Specifically, if there are multiple service instances running, the service instances are set to poll the broker for incoming jobs so that the service instances know when there is work to be done.

SUMMARY

Disclosed embodiments provide a distributed computing environment and middleware for operating that environment. Specifically, the described embodiments provide better throughput, faster application execution, and improved flexibility compared to prior-art approaches, whereby the described embodiment systems allow for improved ability to scale and thus to handle extremely compute-intensive applications. Some of the very demanding applications to which the disclosed architectures can be applied include complex investment models, extremely large database searching, and complex engineering computations.

The disclosed embodiments further provide improved mobility such that the virtualized applications can run on any number of hosts rather than being tied to a fixed host for execution. Also provided are embodiments demonstrating improved flexibility in configuring and upgrading the middleware, as well as improved monitoring and failover of network components and resources.

BRIEF DESCRIPTION OF THE DRAWINGS

Embodiments are illustrated by way of example in the accompanying figures, in which like reference numbers indicate similar parts, and in which:

FIG. 3 is a block diagram of a presently disclosed grid-enabled, service-oriented, high-performance computing architecture;

FIG. 9 is an architectural diagram illustrating an exemplary software development kit approach in which the working client applications can be developed for testing without the necessity of actually installing them on a live computing grid; and FIG. 10 is an exemplary data flow diagram for the architectures described herein.

DETAILED DESCRIPTION

Figure 1:
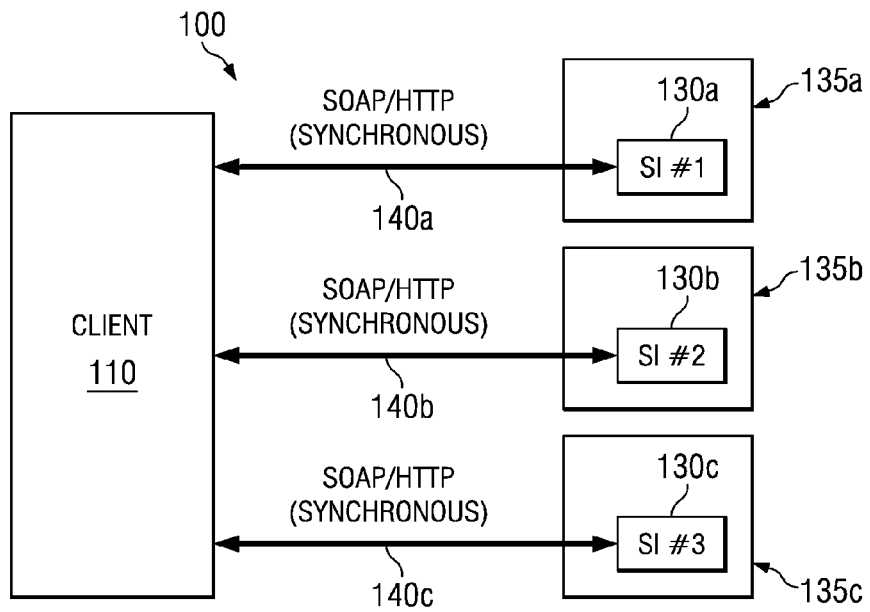
FIG. 1 illustrates a block diagram of a prior-art Service-Oriented Architecture ("SOA") over web service.

Shown in FIG. 1 is a prior-art figure illustrating the architecture of a Service-Oriented Architecture ("SOA") over web service. Shown in the figure is a system 100, which includes a client 110 and remote hosts 135. The client 110 would have one or more services to be executed by remote hosts 135 connected to the client 110 through a web-/text-based communications protocol, such as for example, SOAP, HTTP, or another Internet-oriented and text-based network communication protocol, over communications pathways 140*a-c*. The servers 135*a-c* provide service instances 130*a-c* that will operate on the servers 135.

A disadvantage of the prior-art approach illustrated in FIG. 1 relates to the throughput limitations that are imposed by the coding and decoding of the web-/text-based communications that are used in the network communications protocols that this prior-art architecture uses. Specifically, in order to transmit data from client applications operating on the clients 110, native binary information will have to be encoded into text-based information for transmission over the text-based network communications protocol through synchronous SOAP/HTTP communications signaling pathways 140*a-c*. Further, at the service hosts 135*a-c*, the text-based information will be decoded back into binary format for further processing. Thus, as the applications to be run on the prior-art system transition to high-performance contexts, the text-based coding and decoding of program data being exchanged between the clients 110 and the service instances 130*a-c* will introduce major throughput delays.

Because of the encoding/decoding delays associated with the web-/text-based communications protocol 140*a-c*, this prior-art approach is not generally scalable to multiple parallel high-performance hosts. Such encoding/decoding delays specifically cause bandwidth and speed concerns, and those delays will be cumulative, if not exponential depending on the particular application being run, as the number of parallel service instances 130*a-c* are increased. This prior-art approach further does not allow for dynamic provisioning to generate increasing and decreasing assignments of resources to application instances running on the prior-art computing network 100.

Figure 2:
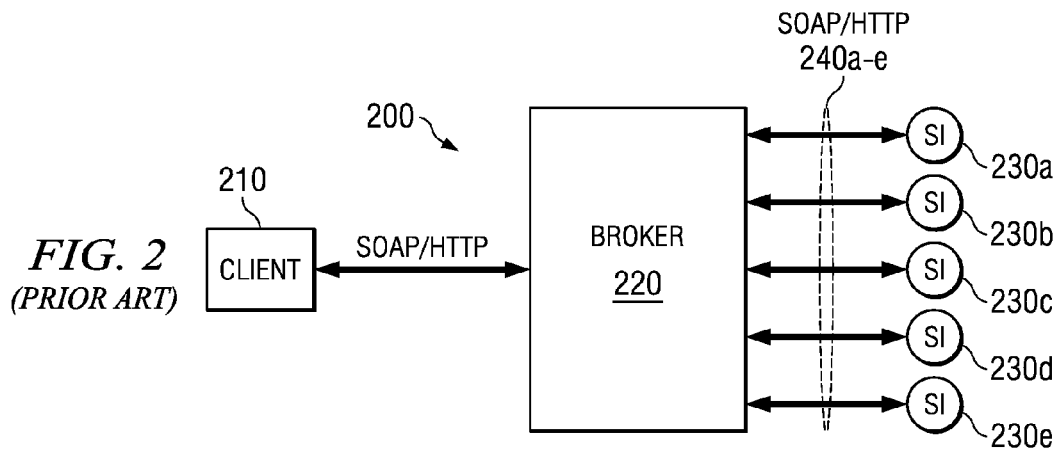
FIG. 2 illustrates a block diagram of a prior-art grid-enabled architecture in which a broker is provided, the broker distributing applications from clients to be run in various service instances upon resources in a distributed-computing network.

Illustrated in FIG. 2 is a prior-art distributed-services approach in which a broker 220 is provided within a network 200 in order to distribute applications from clients 210 to be run in various service instances 230*a-e*. The broker 220 receives jobs from one or more clients 210 and distributes those jobs to the service instances 230*a-e*. The broker also receives the output of the jobs from the various service instances 230*a-e* to provide those job outputs back to the clients 210 who are requesting the work to be done.

As with the other prior-art approach shown in FIG. 1, this approach suffers from the limitations of using text-based/web-based communications protocols for communicating between the client 210, the broker 220, and the service instances 230*a-e*. This approach also is typically implemented with a pull-based access protocol from the service instances 230*a-e* whereby the service instances will notify the broker through an HTTP protocol that the service instances 230*a-e* have additional capacity for processing jobs from the client 210.

A difficulty with the pull-based nature of this web-/text-based communications approach is that it can introduce latency in the roundtrip job processing time. Specifically, if there are multiple service instances 230*a-e*, the service instances must be set to check for incoming jobs and the input queue 224 of the broker 220 so that the service instances 230*a-e*, or the servers running those service instances, know when there is work that needs to be done. If that interval is set for too short of a time, the various service instances 230*a-e* will overwhelm the broker with their polling. If the interval is set for too long, then the service instances may wait some period of time before pinging the service broker 220, and accordingly if the interval is set for too long, there could then be work waiting for a relatively long period of time due to the length of the interval between "pings" from the service instances 230*a-e*.

Illustrated in FIG. 3 is a present embodiment architecture for a high-performance, grid-enabled, service-oriented architecture computing system 300. The illustrated system is a network-based computing system 300 upon which client applications 311 can be run in a distributed fashion. In this approach, client hosts 310 are provided having client applications 311 that will generate workload units or tasks to be processed on resources within the system 300. The client applications 311 interface with the rest of the system 300 through a client application programming interfaces ("APIs") 312.

Within a given system 300, there would generally be multiple client hosts 310 and client applications 311 submitting workloads for execution on the operating on within a given system 300. These client applications 311 interface (through the client APIs 312) with the system 300 through a network resource manager 305. The resource manager 305 provides a look-up service for the client applications 311 whereby the client applications are able to find an available session director. The client application 311 alternatively may access a DNS or other look-up service to find network elements with which to initially interface. The resource manager 305 provides overall supervision for the resources within the system 300, including provisioning, resource failover, load-balancing, and remote execution services for applications that are operating in a distributed fashion on the network or system 300.

As described in this embodiment, a service session manager 315 is provided to distribute the application of workloads that it has received from the client host 310 through the interface 313. Unlike the communication protocols described with respect to the prior-art systems above, the protocol used in the present embodiment is a binary asynchronous communication protocol, which provides for higher-throughput, lower-latency communications, with the improved efficiency due in part to eliminating the necessity to encode and decode program data at both of the client side and host side into text data for communication on a web-/text-based communication protocol as would have been used in a prior-art system. Another approach that will achieve improved throughput and lower latency in the communications is a synchronous binary approach. This approach still preserves the advantage of avoiding coding/encoding of the binary application data that the prior-art approaches would have used to transmit over the web-/text-based communication protocols used therein.

The binary communications protocol applied to the present system 300 is specifically applied to the data flowing through the service session managers 315, as well as to other data and control communications flowing through the high-performance distributed computing system 300. In particular, the illustrated embodiment of FIG. 3 provides for synchronous or asynchronous binary communications through the interface 313 between the client hosts 310 and the service session managers 315, as well as through the interface 328*a-c* between the service session manager 315 and the service instance managers 335*a-c*.

Synchronous or asynchronous binary communications would also be used for communications with the session director 325 and the resource manager 305. Generally, the mode of communication between all of the illustrated grid-enabled network computing components of the present application—Client API 312, SSM 315, SD 325, SIM 335, resource conductor 410 (not shown, see FIG. 4), and resource manager 305—is that of synchronous or asynchronous binary communications protocols. Not all of these components need to be separate processes in the grid-enabled networks, however. For example, in certain embodiments the resource conductor 410 can be provided as a dll/library that is linked into a common execution module with the service session manager 315, and during execution these modules may operate together to provide their functionality. In that context, the combined entities can be considered as a "service manager" having separate resource conductor and service session manager components or modules.

As throughout this application, the number of system elements shown is for illustration purposes. The choice of illustrating three of such service instance managers 335 and three interfaces 328 is merely for illustration purposes, and any number of service hosts 330, service instances 340, and connections 328 to those service hosts and instances would be used in a given distributed system 300. In the present embodiments, the number of these elements that are operational at a given time are dynamically adjusted in the presently described embodiments to provide for a highly scalable architecture to provide high-performance computing in a grid-enabled, service-oriented architecture.

Also provided in communication with the multiple service session managers 315 is a session director 325, which provides overall supervision for the service session managers 315. Each of the service session managers 315 is responsible for operating an application within the distributed computing system 300. In this way, the service session manager 315 distributes the application workloads according to the resources (e.g., service hosts 330) made available to it through the resource manager 305. The session director 325 receives assignment requests from the client hosts 310 over the interface 314. Through the interface 314, the session director 325 receives notice that the client hosts 310 have new applications 311 to run over the network 300.

The session director 325 accordingly provides service session managers 315 to manage the client workloads provided by the client hosts 310. Communications to and from the resource manager 305 and the other elements are provided through high-speed communication interfaces 350. To provide scalable, high-bandwidth communications among, e.g., the session director 325, the service session managers 315, the clients 310, the service instance managers 335, and the resource manager 305, the communications interfaces 313, 314, 328, and 350 used between these network elements and other high-bandwidth network elements in the system 300 are synchronous or asynchronous binary interfaces. Although certain interfaces are shown in FIG. 3, these are not intended to be an exhaustive list of communications interfaces to be used in the system 300, and other such interfaces may be implemented as synchronous or asynchronous binary interfaces or as one or more other types of interfaces.

Still referring to FIG. 3, after the establishment of the service session managers 315 under the direction of the session director 325, the resource manager 305 provides service resources or hosts 330*a-c* as computing resources on the distributed computing system 300. The establishment of this virtual application execution infrastructure enables the distributed computation of the client applications on the network 300. The present application is highly scalable to provide a high level of performance with respect to the assigned applications. In this case, three hosts 330*a-c* are shown in the figure for illustration purposes, although an effective implementation of the present embodiments might use hundreds or thousands of separate hosts 330. The service instances 340*a-c* are specific application kernels that are loaded and operating on the hosts 330.

Each of these separate instances 340 may be operating on different hosts 330, or they may be operating on shared host 340. In other words, one or more of the service instances 340 may operate on a single host 330, although, as described in certain embodiments herein, it may be advantageous to provide logical and/or physical segmentation between the different applications for application isolation purposes.

Within the hosts 330 are the service instance managers 335*a-c*, which provide for the execution of the workloads on service instances 340*a-c* operating on the hosts 330. Each service instance 340 comprises in the present example a service application component 342, which contains the core operating software for the application being run, and a service API component 344, which contains the specific interface for the high-performance middleware network 300. The service applications 342 are made available to the network through service APIs 344. The service APIs 344 specifically provide interface capabilities for the service applications 342, whereby they allow for standardized communications with and interfacing to the network computing system 300.

Still referring to FIG. 3, the service instance managers 335 provide for task workload management and dispatch for the services assigned from the service session manager 315. Again, the communications provided between the hosts 330 and the service session managers 315 are through asynchronous binary communications protocols as contrasted to web-/text-based communications protocols that are known in this context in the prior art. Although in FIG. 3 the service session managers 315 are shown located separately from the hosts 330, it is possible for the service session managers to run in some instances on the same host 330 as at least some of the service instance managers 335. This would not be the usual circumstance, since the systems described here are grid-enabled or distributed computing systems, but some of the described elements in the described embodiments will be co-located, and therefore the described embodiments should not be limited in their application only to computing networks that literally follow the exemplary described architectures herein.

Another advantage provided through this architecture is a demand/event-driven approach whereby the service session manager 315 is aware of which hosts 330, service instance managers 335, and service instances 340 are available for executing the application workloads that have been sent from the client hosts 310. Because the service session manager 315 is knowledgeable about the resources available and their statuses, the service session manager 315 does not have to wait for HTTP inquiries from various application hosts 340 that are available for executing the various applications. Put differently, the service session manager 315 is able to provide workload units to the various service instance managers 335 immediately upon those workload units becoming assignable by the service session manager 315, rather than waiting on a remote HTTP request from one of the available hosts 340.

Still referring to FIG. 3, the service session manager 315 in this approach will manage the workloads for certain applications which come from multiple application-submitting clients 310. The service session manager 315 receives from the resource manager 305 information detailing the available resources that can be assigned for executing these submitted applications. The resource conductor 410 is informed by the service session manager 315 of the SSM's 315 needs for additional resources. This is communicated either through statistics or summary information from the SSM 315, detailing the resource needs, or by workloads routed through the resource conductor 410.

In embodiments involving the resource conductor, the resource conductor 410 is responsible for prioritizing the workload requests from the multiple clients 310 according to service level agreements in a manner such as described in the commonly owned patent application, "Method and system for utilizing a resource conductor to optimize resource management in a distributed computing environment," U.S. application Ser. No. 11/694,658, filed on Mar. 30, 2007, which is incorporated by reference herein in its entirety. In this way, the work can be assigned efficiently so as to effectively assign resource capacity according to policies set according to the needs of the one or more clients hosts 310 and their owners.

Figure 4:
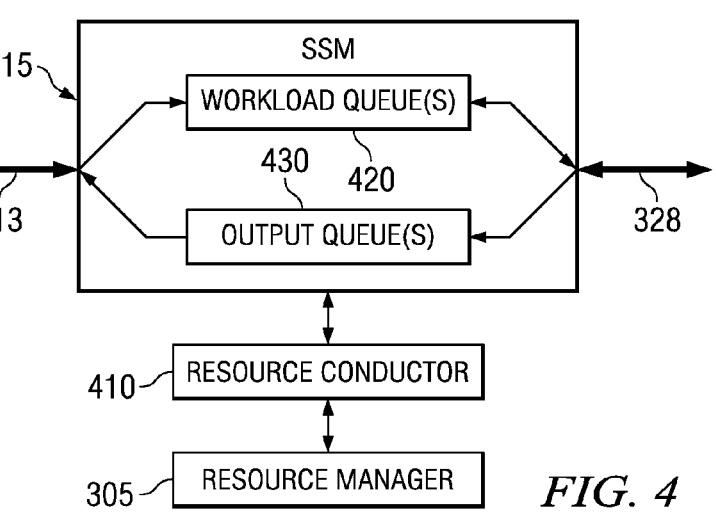
FIG. 4 is a high-level architectural diagram of the FIG. 3 approach, further including a resource conductor interposed between the service session manager and the resource manager.

Shown in FIG. 4 is a broad-level architectural scheme for use, for example, with the system of FIG. 3. Specifically illustrated in FIG. 4 is a resource conductor 410 which is used as was described in accordance with the above-cited "Method and system for utilizing a resource conductor" application (No. 11/694,658). In a system such as that shown in FIG. 3, the resource conductor 410 would be interposed between the service session manager 315 and the resource manager 305.

FIG. 4 also generally illustrates the workload queues 420 that are used for incoming workloads that are to be assigned to resources (e.g., service instances 340) in the network 300 and the output queues 430 for workload results that are received from the resources (e.g., service instances 340) after the resources have processed the assigned workloads. It is possible to handle the queuing for all clients and workloads as a single workload queue or as multiple queues for the workloads 420 and the workload results 430.

Each service session manager 315 can handle multiple clients 310, and each of the clients might have multiple sessions. In a single-queue embodiment, the workloads from all of these clients and sessions could be combined in a single queue 420 for outgoing workload assignment and the workload results could be combined into a single output queue 430 for returning to the multiple clients and multiple client sessions. Alternatively, there might be a unique workload queue 420 and output queue 430 assigned to each individual session, in which case there could be hundreds or thousands of separately defined workload queues 420 or output queues 430.

The flow of the workloads through the service session manager 315 are generally as indicated by the arrows shown in FIG. 4. The incoming workloads are received via the client interface 313 by the SSM 315 and placed in the workload queue 420. The workloads generally flow from the workload queue 420 to assigned service instance managers 335 through the service interface 328, but the bidirectional arrow here indicates that workloads may be re-queued in the workload queue 420 even after they have been sent out from the SSM 315. The arrows in the path through the output queue 430 are shown as unidirectional arrows flowing from the service interface 328 to the client interface 313. Multiple queuing designs are possible in the context of the present disclosure, however, and accordingly neither of the above-described approaches should be taken as limiting upon the claims set forth at the end of this specification.

Still referring to FIG. 4, the embodiments in this figure shows that the resource conductor 410 assigns resources to the service session manager 315 for handling of the workloads in the workload queue 420 based on the resources made available through the resource manager 305 and generally as requested by the service session manager 315. The resource conductor 410 is specifically able to balance the needs of the application, as requested by the service session manager 315, with the resources made available by the resource manager 305. Once the resource conductor 410, in coordination with the resource manager 305, has made this assignment of resources to the service session manager 315, the service session manager 315 is then operable to directly manage the service instance managers 335 operating on the assigned resources as indicated in the connections 328 as shown on FIG. 3.

With further reference to FIGS. 3-4, the resource conductor 410 provides an interface between the service session manager 315 and the resource manager 305. The resource conductor makes a top-level assignment of resources (e.g., services hosts 330) available for the service session manager's 315 use. Effectively, the use of the resource conductor 410 with the service session manager 335 provides two-level scheduling, which further improves the performance of the network 300. The improved performance comes from the fact that with the two levels of scheduling it becomes unnecessary to have a single resource manager that provides for shifting allocations and resources happening at a lower level of detail.

Once the service session manager 315 has a certain level of resources assigned to it, it is able to make dynamic assignments of workloads to the assigned resources according to the system needs at the time. Specifically, the service session manager 315 can consider a number of possible policy and/or resource availability and efficiency issues. For example, the service session manager 315 can consider one or more of the following issues:

the priority of workloads as indicated by the client applications 311, or based on an indication in the workload itself or based on some other external basis;

the availability of resources;

based on minimum and/or maximum requirements of a workload (session/tasks) for services instances. For example, a session can demand a minimum number of services regardless of whether there is that much work or not; this may satisfy a requirement/service level agreement for responsiveness for the particular session;

the possible re-use of resources for the new workloads from the same client application 311 and/or execution user;

based on the capacity of the service instance host (CPU capacity, etc); distribute fastest ones to each session and then slower ones and so on; this approach could be used on its own or in conjunction with other approaches such as selection by workload priority or minimum/maximum workload requirements;

based on locality of data, e.g., there can be a preference to distribute the workloads based on where the data needed to compute exists; partial results, for example, may have been computed before; and based on "first come, first serve" basis; thus, sessions created first get all the service instances that they request, if available.

The service session manager 315 is further able to communicate the workload results via the output queue 430 back to the client applications 311 via the interface 313.

Figure 5A:
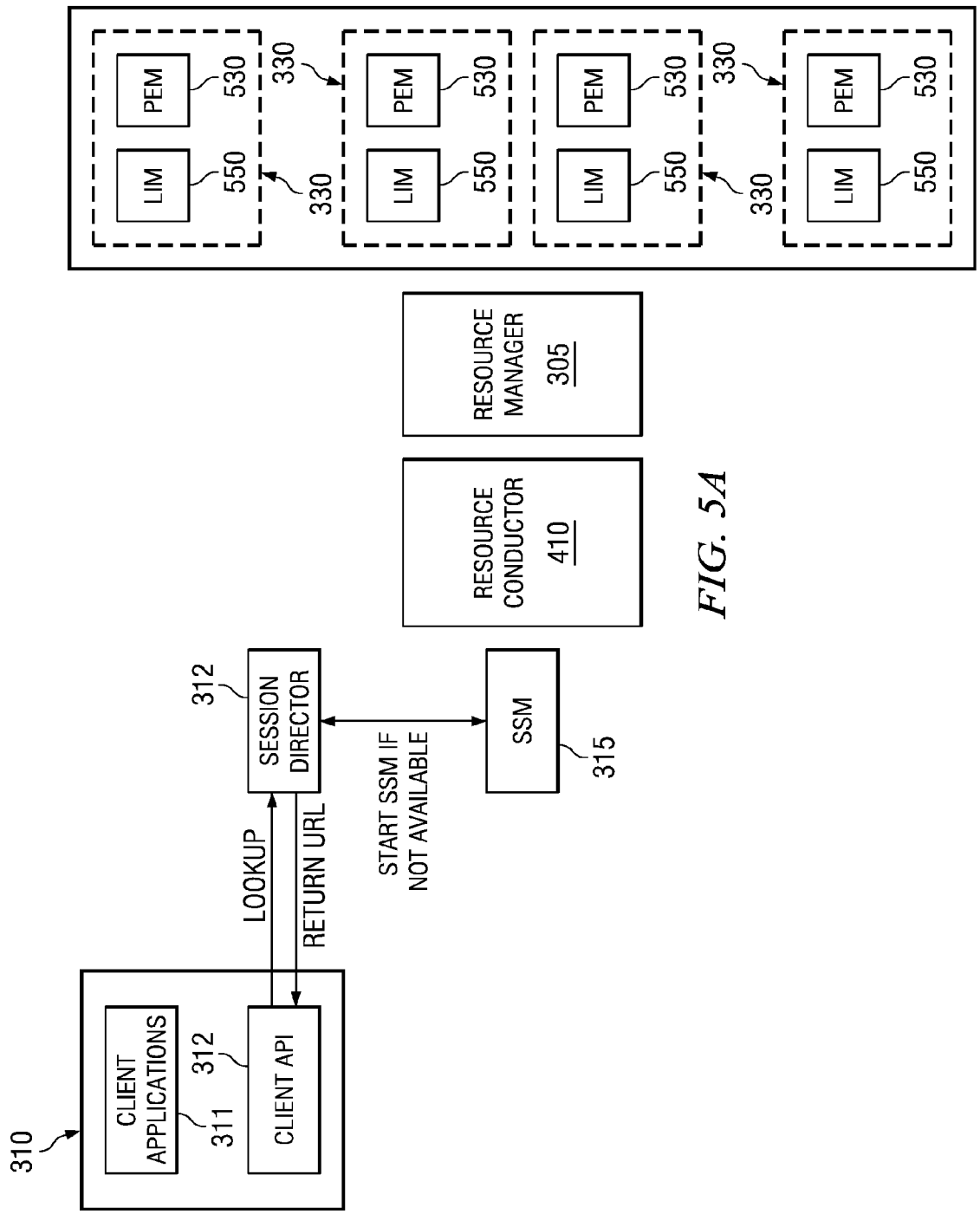
FIGS. 5A-5D provide a series of block diagrams illustrating the steps that are taken when a service instance is initiated and a workload assigned in the network.

Referring now to FIGS. 5A-5D, illustrated in these figures is a series of block diagrams illustrating the steps that are taken when a service instance is initiated through a workload assignment through the service session manager 315. As shown in FIG. 5A, the process begins when the client application does a look-up to the session director 325, which will look to see whether a service session manager 315 is available for operation with the client API 312. If the service session manager 315 is available, the session director 325 returns a URL or other address for the service session manager 315, such that the client API 312 may now directly access the service session manager 315. If a service session manager is not then available and "running," however, the session director 325 can start the service session manager 315 and provide an operating instance of the service session manager 315.

The data communications and control communications among the session director 325, the service session manager 315, and the client API 312 are synchronous or asynchronous binary communications in the disclosed embodiments in order to increase throughput and reduce communications latency. This approach will be used in some or all of the below-referenced interfaces as needed in order to similarly increase throughput and reduce latency.

Figure 5B:
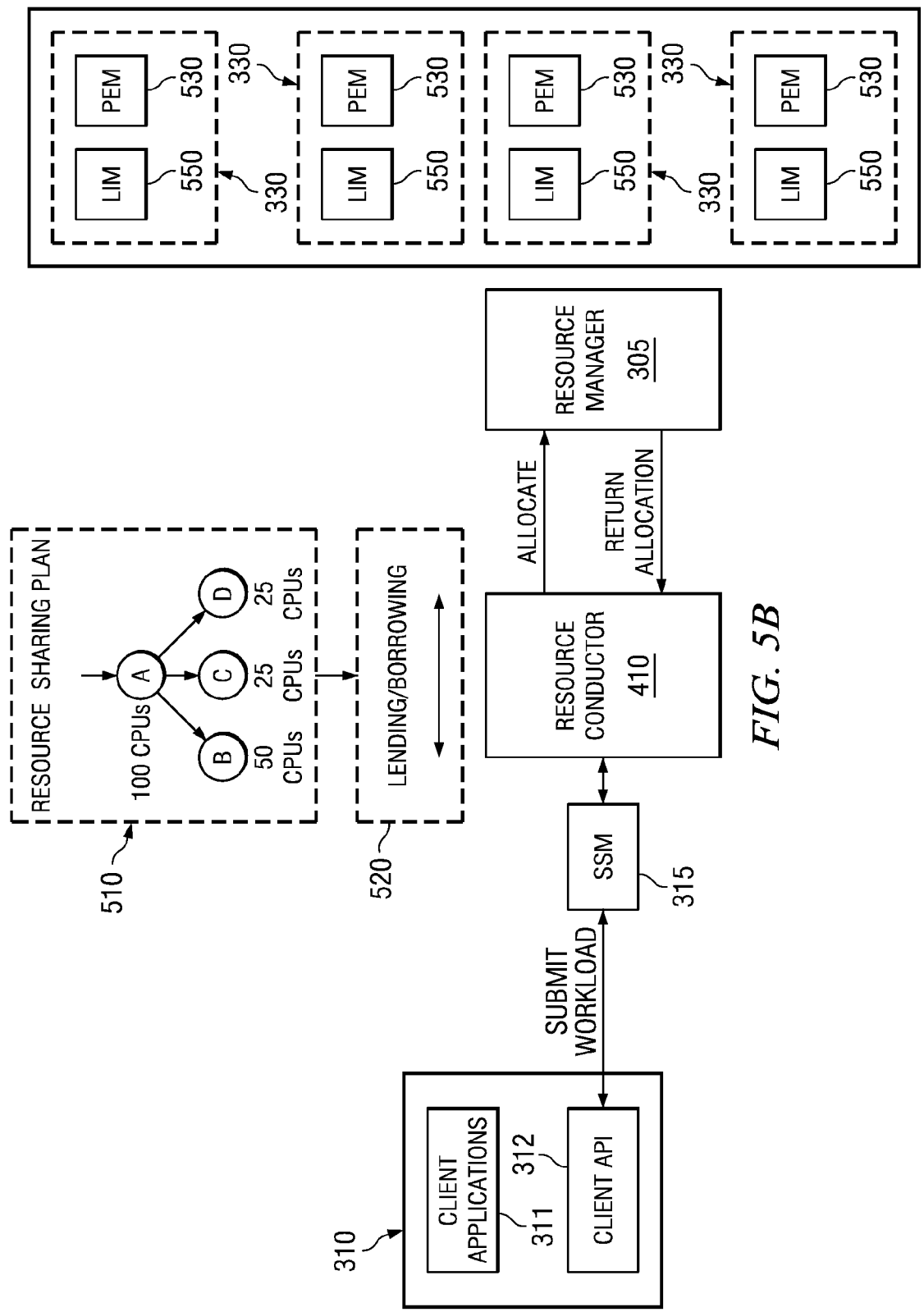

Once a service session manager 315 is in communication with a client API 312 as described with respect to FIG. 5A, FIG. 5B then shows the service session manager 315 communicating with the resource manager 305 to make an allocation request through the resource manager 305. This resource request is done through the resource conductor 410, as was described with respect to FIG. 4. The resource manager 305 has knowledge of the available resources for the service session manager's 315 use, and the resource manager 305 therefore is able to make a return allocation of the resources. Specifically, as was previously described, the resource manager 305 provides addresses at which the service session manager 315 can communicate directly with various resources in the network 300.

With further reference to FIG. 5B, as shown to the left of the resource manager 305, an exemplary resource sharing plan 510 is illustrated in this figure. The top level of resources, 100 CPUs in this example, was assigned according to the resource conductor's 410 balancing the needs of the client hosts 310 with the available resources under the control of the resource manager 305. As shown in the present example of the resource sharing plan 510, the 100 CPUs may have been divided by the resource manager into groups of 50, 25 and 25 according to various applications that are being run.

Procedurally, a service session manager 315 may request new allocation levels, either at an increased or decreased level, and the resource manager 305 can make new allocations to the requesting service session manager 315 and, depending on need, to one or more additional service session managers 315, according to service level agreements that are used by the resource manager 305 to make such assignment decisions. In addition to the allocation of resources according to various service level agreements as described above, the resource manager 305 may also be responsible for implementing a lending/borrowing plan as generally illustrated in box 520. Through the lending/borrowing plan 520, the various applications operating on the system can develop a plan for sharing resources or lending or borrowing resources as between each other according to shifting demands of the various applications. The resource manager 305 would be responsible for implementing that lending/borrowing plan 520.

Figure 5C:
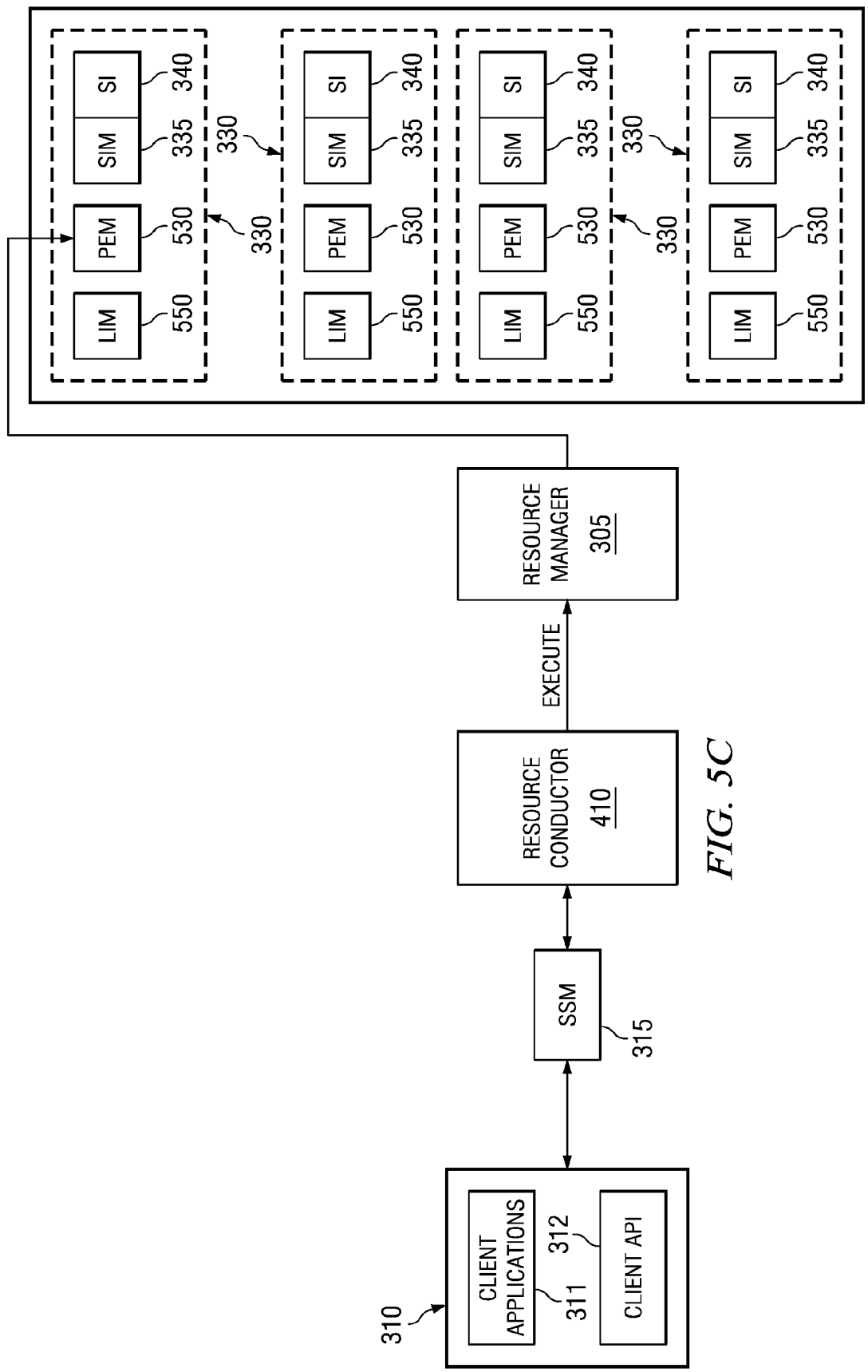

Referring now to FIG. 5C, once resources such as the service hosts 330 have been committed to it by the resource manager 305, the service session manager 315 can then set the resources to executing the applications 311 according to the execute command shown in FIG. 5C. This execute command contains the allocation and containers for the resources for that application, where the allocation basically provide the identity of resources that were returned by the resource manager 305 and the container is the command to be executed. In the present embodiment, for example, the container points to the service instance manager executable. The resource manager 305 will then pass on the execution command to the responsible resources through a Process Execution Manager ("PEM") agent 530, which is responsible for the remote execution service on, e.g., the service hosts 330, as an agent of the resource manager 305. Once the assignment of resources has been made through the process execution manager agent 530, the service instance manager 335 can be placed in direct communication with the service session manager 315 such that the intermediate elements can now be removed from the communication chain.

Figure 5D:
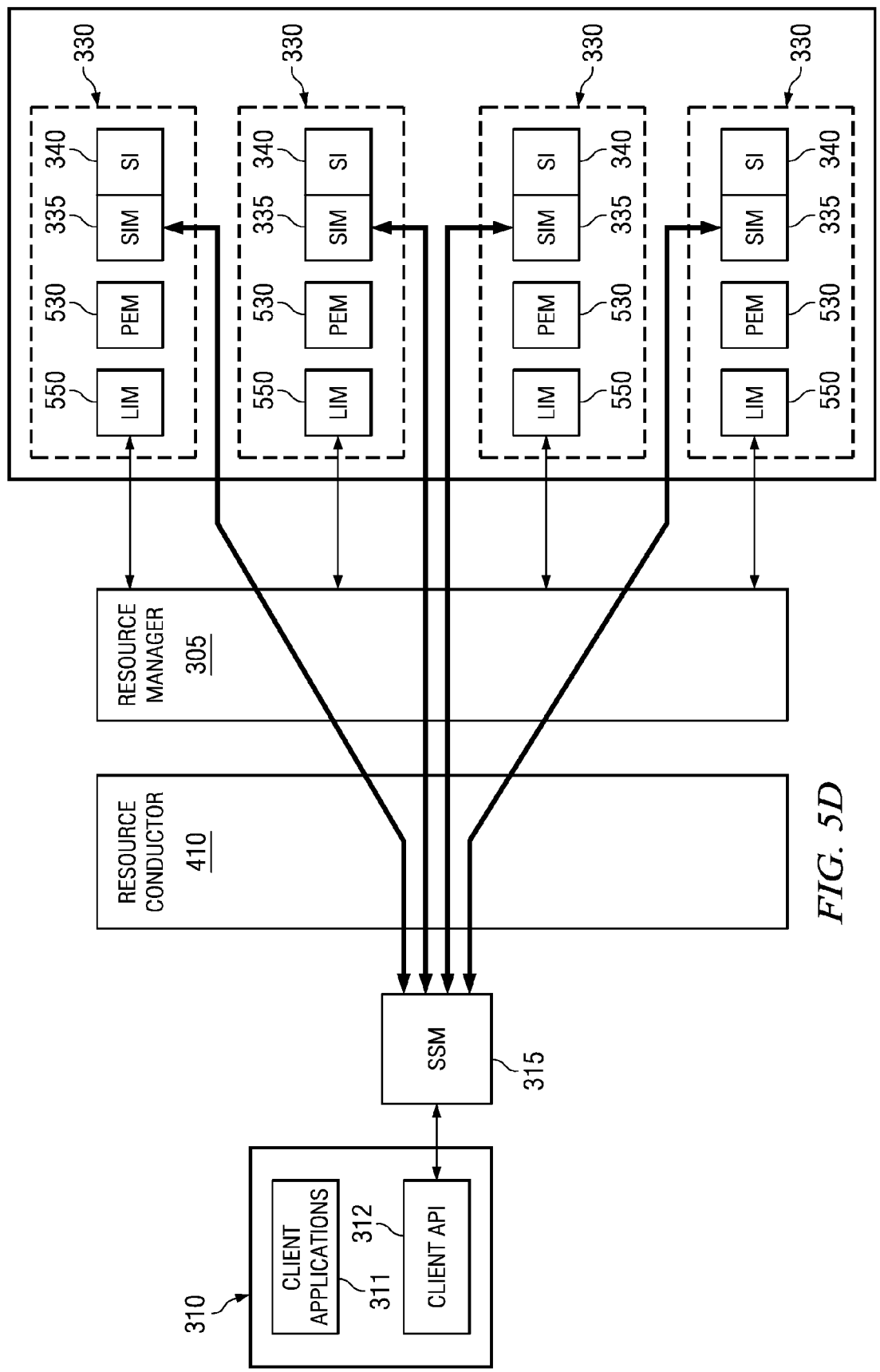

FIG. 5D illustrates the system at the condition in which the service session manager 315 is in direct communication with the service instance manager 335 for the handling of the execution of workloads. At this point, the service instance manager in turn provides the interface to the service instances 340 operating on the respective service host 311. This operation can continue if the operation of the various applications on the service instance manager/service instances 335/340 continue, these network components now operating directly under control of the service session manager 315. Although operationally the service session manager 315 is directly communicating with the service instance manager 335, there remains a resource manager agent 550 known as the Load Information Manager ("LIM") which monitors service host 330 statistics such as memory usage and CPU speed.

There may, however, be instances where resources are to be lent out, borrowed back, reclaimed, or otherwise requested for additional (or fewer) resources to be applied to or on behalf of the current service session manager 315 or from another service session manager 315. The action of adding or subtracting resources may be initiated by the service session manager 315 notifying the resource manager 305 through the resource conductor 410. The lending out of resources, borrowing of resources, returning of borrowed resources, or reclaiming of lent out resources, however, are actions that are initiated in the present embodiment by the resource manager 305. Through the policies described in service level agreements, the resource manager 305 can accordingly make a new allocation of the resources in response to the shifting resource allocation requests from the service session managers 315. If resources are to be assigned to a new service session manager 315, the service session manager 315 establishes the direct communication with resources through the resource manager 305, as was previously described.

Figure 6:
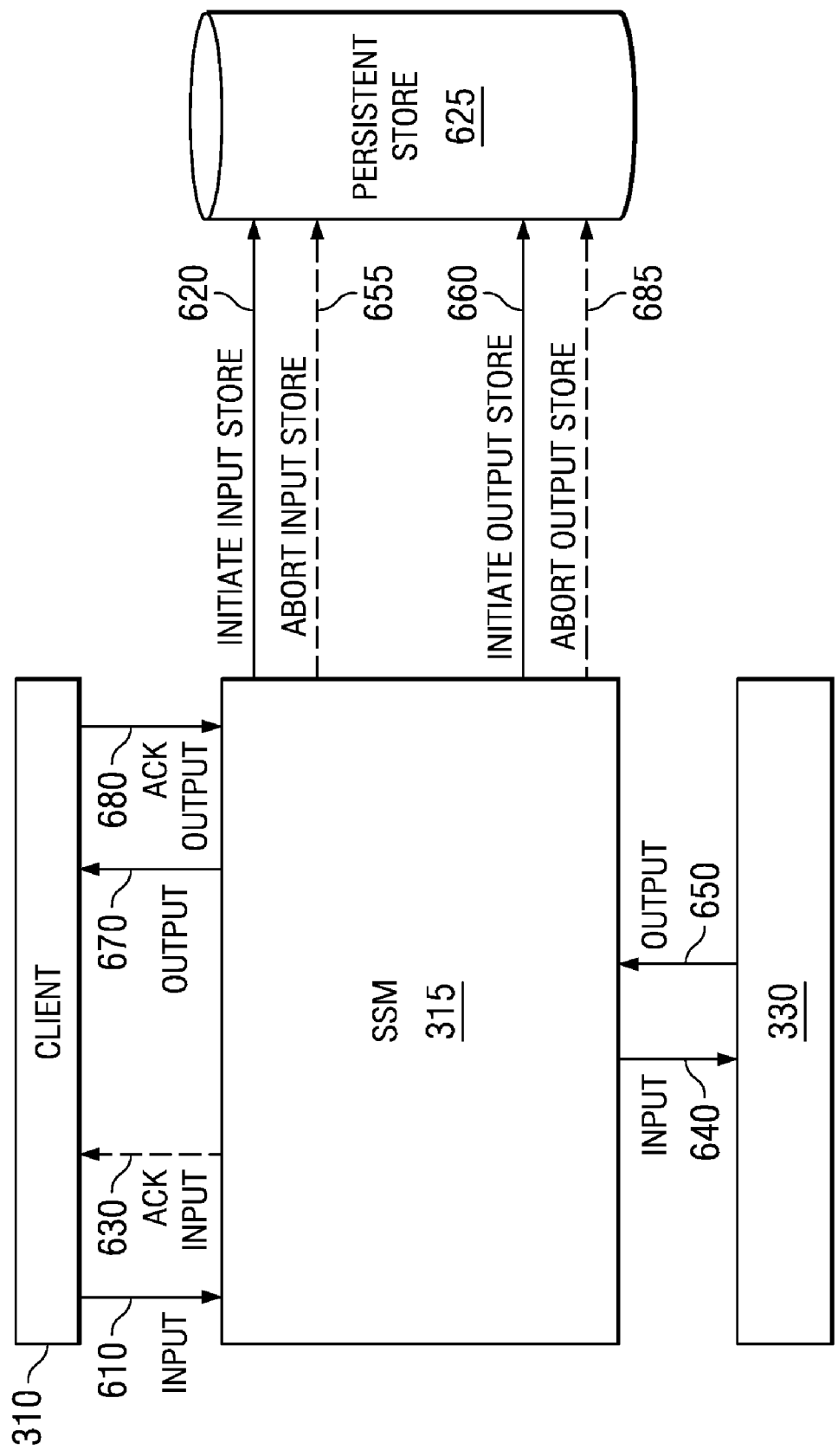
FIG. 6 is an architectural diagram illustrating a persistent store approach that can be used in conjunction with the embodiments described herein.

FIG. 6 is an architectural diagram illustrating a persistent store approach that can be synergistically applied to the presently disclosed embodiments. This details of the persistent store approach are further described in the commonly owned application entitled, "Method and system for information exchange utilizing an asynchronous persistent store protocol," U.S. application Ser. No. 11/735,125, filed on Apr. 13, 2007, which is incorporated by reference herein in its entirety. The synergy is that if you apply the web-/text-based interface in a high-performance, grid-enabled architecture, to preserve the performance gains in context where a back-up or persistent store of the application data and/or workload units being exchanged, it is important that the process not be slowed by waiting on relatively slow persistent data storage processes.

The embodiment described in FIG. 6 would operate in those instances in which a persistent store is desired. Such persistent store back-up is not necessary for all applications, however. Particularly for fast-executing jobs, it might be easier for the client application itself to monitor for workload execution results to be sent back to the client application 311. But in other instances the storage back-up may be advantageous, for example, in very compute-intensive applications where the result may be delayed. In those cases, the client application 311 may want to be able to provide its workload request and then "forget" about the process, eschewing any real-time monitoring of the process.

Thus, as illustrated in FIG. 6, the persistent store can be provided for periodic follow-up by the client application 311. The reference numbers in this section use parenthetical references for the actions, whereas the system elements are indicated using normal reference numbers. As shown in FIG. 6, the client 310 sends a workload input (610) to the service session manager 315. The service session manager 315, upon receiving the workload input, initiates the workload input store process (620) substantially at the same time as it is sending the input (640) to the service instance manager 335 (not shown, see FIG. 3) within the service host 330. Now, if the service host 330 provides an output (650) from its execution of the assigned task before the initiated input store process (620) is completed, then the service session manager 315 can initiate an abort input store process (655). The reason for aborting the input store process (655) is that there will be no need to continue to store the workload input as a "back-up" if the workload output is already available.

As an option of the client application 311, with the return (670) of the output, the service session manager 315 substantially at the same time can initiate an output store (660). If the client application then acknowledges receipt of the output (680) back to the service session manager 315, service session manager 315 initiates abort the output store (685), because if the client application 311 has received the output, then there is no longer a need for a persistent storage of that output from a back-up standpoint. Using this method, it is possible to provide for back-up or recoverability, while because of the simultaneous passing on of the workloads the back-up and recoverability are provided without sacrificing performance. Further efficiencies are gained by the ability to abort the persistent storage process if workloads and results are expeditiously provided and acknowledged by the network computing elements.

Using this persistent storage method, for example, if the service session manager 315 fails before the input had been acknowledged (630), the client would have to resend the work. But if the acknowledgment (630) had been sent to the client, the client would not have had to re-send the workload. In that case, had the service session manager 315 failure happened or had another system failure have happened, the service session manager 315 would be able to recover the workload from the persistent store 625 and continue working.

Figure 7:
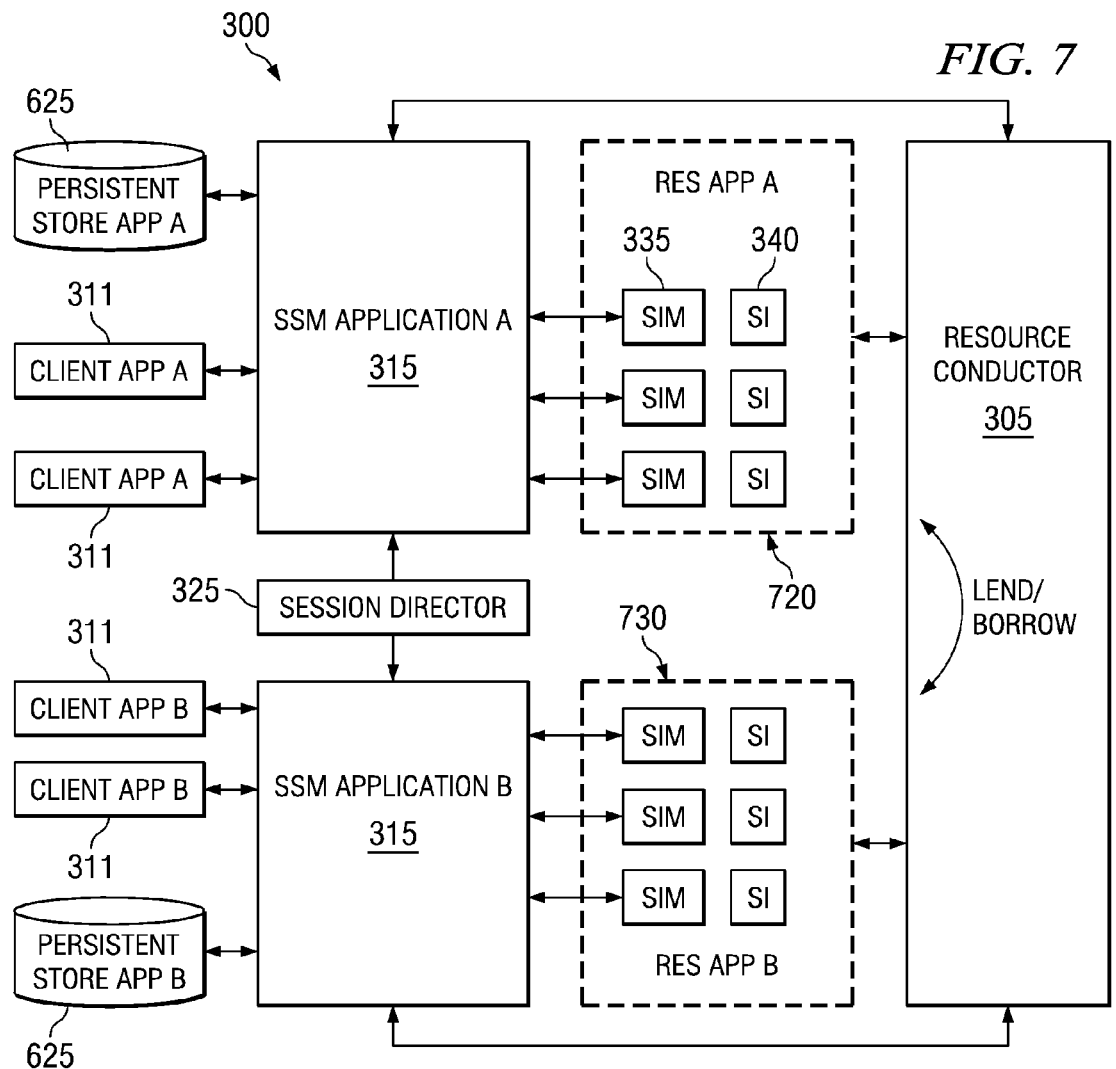
FIG. 7 is an architectural diagram showing multiple client application instances, multiple service session manager instances, and multiple services instances operating in the grid-enabled, high-performance distributed computing system.

Referring now to FIG. 7, illustrated in this figure is an architecture showing multiple client application instances 311, multiple service session manager 315 instances and multiple service instance manager 335 instances operating in the grid-enabled, high-performance distributed computing system 300. Generally speaking, this architecture elaborates upon the general architectures previously described, but further illustrates the parallelism that exists in the general context. This described architecture provides for isolation between different applications such that multiple applications will not share the same resources simultaneously in an unmanaged way between each other.

More specifically, the architecture described here provides the capability for applications to be operating on multiple resources in a grid-oriented architecture, but also provides for the flexibility of dynamic allocation of the resources through the resource manager's 305 lending/borrowing process, which is described above in this application and in the commonly owned patent application, U.S. application Ser. No. 11/694,658, as previously cited and incorporated by reference herein in its entirety.

The present FIG. 7 illustrates a case with two different client applications 311. Together there are four instances of those two client applications 311, with two instances of "Client Application A" and two instances of "Client Application B 310." Each instance of the applications represents a different user of the respective application, such that the four instances in total represent two users of Client Application A and two users of Client Application B. These client applications 311 interface with the networked computing system 300 through service session manager 315. One service session manager 315 is the service session manager 315 for Application A ("SSM App A") whereas another one is for Application B ("SSM App B").

The relationship of these grid network components 311, 315 is generally described above in FIGS. 3-6 of the present application, and is further described below. As described, these service session managers 315 operate under the control of the session director 325. Also as described with respect to FIG. 6, the service session manager 315 may further interface with the persistence storage 625, depending on whether the client application 311 or other network components or elements request that a persistence storage process be implemented for them. Because there are two separate service session managers 315 and two separate persistence stores 625, this architecture provides for isolation between the data as between those network elements. Further described are the various service instances 340 as implemented by the service instance managers 335. Shown in this figure is an isolated group of service instance network components or elements 720 ("Res App A") and another isolated group of service instance network components or elements 730 ("Res App B") for the Applications A and B respectively.

Through the resource manager 305, and using the techniques for resource management described above, if resources become available or are needed to be lent or borrowed between the various client applications under management of the service session managers 315, the resource management techniques implemented by the resource manager 305 can be implemented using the resource reassignment techniques previously described. As illustrated here, however, when such resource reallocations or initial allocations are not being made, the resource manager 305 remains in the background and the service session manager 315 is able to communicate directly with the service instance managers 335 (see also FIG. 5D). This architecture provides for isolation, flexibility, mobility, and many other advantages as will be described below.

Through these isolation techniques, the distributed computing system 300 can provide a first group of network elements and resources for a first client or a first execution user and a second group of network elements and resources for a second client or a second execution user. The first group of network elements and resources are logically separated from each other, although according to differing system design concerns it is not necessary that each and every network element and resource be logically separated. This logical separation relates to the workload processing network elements such as the service session managers 315, service instance managers 335, service instances 340, and persistent store 625, or logical divisions of these elements. The resource manager 305 remains responsible for the overall resource assignments and is operable to communicate on an as-needed basis with the above network elements, and specifically at least with the service session managers 315.

By the implementation described above, the isolation techniques provide for both logical isolation and security, but also provide a flexible means of allocation of resources in a service-oriented architecture context. Various means of isolation as enabled and implemented herein include providing the resources and network elements (1) for a virtual machine ("VM") executing on the distributed computing system 300, wherein the VM would only have access to those elements defined as being within the VM, (2) for permissions-based resource access by applications and/or execution users to whom those resources and network elements have been assigned, and (3) for a system clean-up ("scrub") and re-initiation process whereby if a set of resources and/or network elements are assigned to a new application or execution user those resources and/or network elements are sufficiently "cleaned" such that sensitive data is deleted/moved/provided to the user and made unavailable for any new application or execution user that is given access to the same physical resources.

As mentioned, the architecture described here provides a number of advantages over known prior-art systems. Specifically included in these advantages are the advantages of application mobility and application isolation. It is further possible due to these advantages to implement an improved and transparent middleware upgrade process wherein the client applications and their workloads continue to operate without affect by the upgrade process.

Regarding the improved upgrade process, the embodiments described herein provide an approach for upgrading the middleware for the network elements, including when those network elements are currently executing/handling applications operating on workloads within the distributed computing system 300. These advantages are enabled because of the mobility and flexibility disclosed herein.

Specifically, to perform an upgrade in accordance with the present embodiments, the new middleware software version can be installed in a new directory of an operating server for the middleware. The operating server can be hosting any of the network elements for the system 300, so that the specific network element can receive its updated software this way. For example, there may be middleware updates for the SSM 315, SIM 335, client API 312, service API 344, resource 305, session director 325, resource conductor 410, persistent store 625, or other network elements. Dependent on software design approaches, these elements can be upgraded as a group or separately.

Assuming for purposes of discussion that the upgrades occur separately for each element, then for the element being upgraded the new middleware can be installed and placed in its execution mode on the host server for that network element. As mentioned, the various network elements can in some cases be located on the same host server and in some cases on different host servers. Due to the flexibility of the architecture and the portability of resources, new workloads can either be transitioned to the upgraded middleware instances by operating those new workloads in parallel or by immediately switching over the execution of the workloads to the new middleware installation. In other words, the flexibility and mobility of the embodiments described herein provide for the simultaneous installation and possibly running of most versions of the middleware within the same grid network 300. Essentially, these parallel installations can operate as a separate instances on the network applications, and in one implementation can run parallel, different versions of the middleware, and in another implementation can provide for a near-instantaneous switch from one version of the middleware (operating as one instance) to another version of the middleware (operating as another instance).

Still referring to FIG. 7, further advantages provided with the described approach are set forth below. One advantage is the separate administrative control of the different applications operating on the distributed computing system 300. Because the different client applications 310 use resources that are provided through different service session managers 315 and managed by different service instance managers 335, with persistent storage back-up being provided through different persistent stores 625, administrative control of the present application allows for the separate administration of the applications running on the system 300.

Another advantage that of security from providing data and execution isolation between different applications running on the system 300. The service session manager 315, the persistence store 625, and other network elements being used, all can be logically separated through the separate administration thereof to provide isolation. Such isolation is important to ensure that different applications are not accessing the same network elements or the same resources simultaneously, as such simultaneous accesses runs the risk of different users employing different applications that are accessing the same data and possibly receiving information to which they would not be entitled to because they are from a different organization or have a different security levels within the same organization.

As a further example of application and data isolation, illustrated in FIG. 7 as the Application A resource group 720 are multiple service instance managers 335. Along with the service instances 340, these can be configured as specific to an execution user within the system, such that the users themselves have defined resources available to them that would not be assigned to other users. Specifically, for this example, the fact that a service instance 340 is running as a specific execution user can provide the final security because execution user resources would be defined and delimited as belonging to the execution user alone. Although the resources may be virtualized, the system middleware would be defined to clean up after itself when reassigning new physical resources to different virtual application execution tasks.

As another example, the isolation and segmentation of the network elements according to their operating applications further provides for segmentation of configuration files for the separate applications. It further provides for different workloads, scheduling policies, and recovery strategies according to the different applications that are specific to the separate applications. The isolation between workloads can provide for the different administration of the workloads, scheduling policies and recovery strategies between applications. Although the isolation described above provides for the above-mentioned application-specific workloads, scheduling policies, and recovering strategies, at the same time the flexibility of the system allows for the lending, borrowing, and reclaiming of resources according to dynamic application capacity needs.

Further, the segmentation of the client applications provides for configuration policies, persistence policies, and other types of policies depending on the specific needs of the various client applications. For example, certain client applications may operate in a very short timeframe, in which case persistence is not necessarily needed to store the temporary results in the work submitted, whereas other applications may require a great deal of time to execute and may be advantageous for those applications to have a persistence storage such that the client application can assign the task and forget about it rather than checking up on it immediately after that. Maintaining security of the history of the application is another advantage of the service isolation provided in the disclosed embodiments. Thus, the present embodiments provide for security of history files, configuration files, and other types of application data files.

Figure 8:
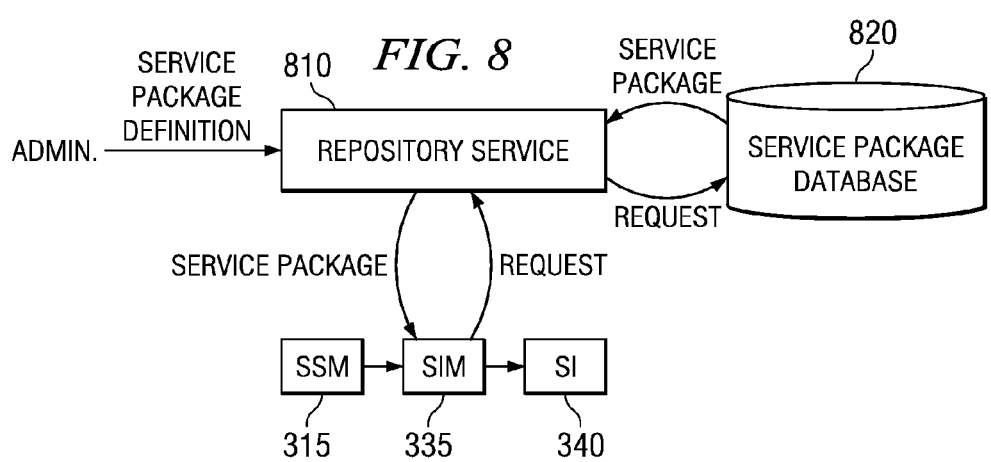
FIG. 8 is an architectural diagram illustrating a system for providing service packages to establish operational service instances in new locations in the grid-enabled, high-performance distributed computing system.

Illustrated in FIG. 8 is an architecture for providing service packages to the service instance managers 335 when the service instance managers are called on to established an operational service instance in a new location in the network at the request of the service session manager 315. In this context, such as for instance when the service session manager 315 has moved a service instance 340 from one service host 330 to another or has requested a new service instance be established, the responsible service instance manager 335 will request from a repository service 810 a service package for the installation of that new service. The repository service 810 includes service packages that were established at one point in time by the administrator of the particular application.

Within the architecture shown in FIG. 8, an administrator defines the service packages to contain, for example, a configuration file, an application executable file, and extraction instructions for opening up the service package and operating it or installing it on a host server 330 as the service instance 340. The service package may of course include additional instructions or parameters or data such as it would be needed to correctly install the service instance on a server, so this list is not meant to be exclusive. The service instance manager 335 would receive service packages from the repository service 810, which in turn would retrieve the service packages from a service package database 820.

Upon receipt of the service package, the service instance manager 335 would then provide the service package for installation upon the server 330. The service package will then, upon extraction and installation, operate as a service instance 340 under the management of the service instance manager 335. It should also be noted, that the service instance manager 335 may already have a service package in its local memory or operating on a local server, in which case the service instance manager 335 would not need to request the service package from the repository service 810 and would be able to just generate and install the service package on the server 330 or provide an interface to an already-operating service instance 340 on the server 330.

Illustrated in FIG. 9 is an exemplary software development kit approach in which the working client applications can be developed for operation on the grid-enabled, service-oriented architecture middleware without the necessity of having the client applications under development actually operate on an operating computing grid. Thus, as shown in FIG. 9, the software development kit includes the core middleware 904, which is provided with interfaces to the client applications on both the client application side and on the resource host side, whereby the application can be developed to ensure operation on both sides of the middleware.

The software development kit described in FIG. 9 addresses an important aspect of the middleware, which is the resource manager's 305 (see FIG. 3) interfacing with the grid 300 itself. In the described development kit 900, a simulated resource manager 905 is provided to simulate the operation of the grid itself under conditions when the resource conductor 910, which is a part of the actual core operating middleware software 904 provided in this development kit 900, seeks to communicate with the resource manager 905 to determine things like available resources and the like. The client application 902 under development can thereby be inserted and plugged into the middleware 904 to determine whether it properly operates with the middleware software 904, and similarly the service application under development can be inserted at 906 to test its functionality.

With further reference to the exemplary software development kit 900 of FIG. 9, the software development kit 900 provides APIs that are layered. "Layered" in this context refers to providing a core API along with various software language specific APIs layered on top of the core API, such that the core API can remain the same and yet the software development kit 900 is operable any one of the native languages normally used in the applications environment. This flexibility is provided at both of the applications side 902 and the service instance side 906, and this provides an ease and consistency of interface to the users.

FIG. 10 is an exemplary flow diagram for the architectures described herein. The left side of the figure illustrates various clients 310 sending workloads as inputs to the service session manager 315. Those workloads are passed on from the service session manager to the service instance manager 335, and the configuration of the middleware of the grid-enabled, service-oriented high performance architecture is provided through the administrative interface 1010. The middleware can monitor for issues such as whether a component or components within the network have, for example, sufficient physical or virtual memory assigned to it to perform the assigned applications. For example, the address space in a 32-bit system is two gigabytes, and the service session manager 315 or other middleware element can accordingly monitor whether that two gigabyte limit is being approached.

In a specific embodiment, when a client API 312 has established a direct connection to the service session manager 315, the service session manager 315 can notify the client API 312 if there are run-time problems such as described above. This notification can be used to throttle incoming workloads from the client application 311, whereby the system 300 has the opportunity to manage recovery of the run-time problem and avoid outright failure.

Embodiments of the middleware described herein can also determine if a script has stopped running or monitor for other runtime problems. As another example, if resources trigger alerts, or if various managers in the system 300 otherwise detect resource operational issues or capacity issues in the system, the middleware can throttle connections, such as limiting the bandwidth for receiving incoming workloads or refusing to open the queue in the service session manager 315 for additional workloads, until such time as the resource operational issues or capacity issues can be worked out. For example, if there is a memory capacity issue, the memory can be flushed in an orderly fashion so the capacity issue can be worked out without having a system failure. As the problem clears, the channels can be opened up for additional incoming workloads. As another possible capacity management approach, as the service session manager 315 is running out of capacity, it can notify the session director 325, which can start a new service session manager 315 to handle the additional capacity need.

The ability to throttle incoming workloads combines powerfully with the persistent storage techniques described herein such that, in addition to being able to work through capacity issues, the persistent store 625 can be used to reduce or eliminate the risk of loss of workload data or output data associated submitted workloads. The persistent store 625 can also be used during the handling of capacity issues or other runtime issues as a temporary store to hold submitted workloads from the client applications 310 and completed outputs submitted from the service instance managers 335, which in turn would have received them from the service instances 340 (not shown, see FIG. 3) that they were managing.

Described herein are embodiments for monitoring within the service session manager 315 or other middleware elements the usage of resources, memory space, script execution, or other resource or run-time issues. Further described are mechanisms for gracefully reconfiguring resources or middleware components, such as by throttling inputs from clients applications 311 while resources and middleware components can be brought back online. Another element, for facilitating the graceful management of capacity is the swap space 1020, which can be used to store various application data packages or runtime environments until the resources or computing grid elements can be brought back online. The swap space 1020 can be used for such temporary or even redundant storage of operating data and environment to reinstitute operational elements in the distributed computing environment and thereby to avoid failure of processes operating on the network.

With further reference to FIG. 10, and with reference also to FIGS. 3-4, the present embodiments provide for multiple layers of monitoring of run-time execution processes and failover mechanisms. As described above, the current embodiments provide for flexible and dynamic allocation and reallocation of resources along multiple layers. Using the mechanisms described, should an executing service instance 340 fail while executing on its service host 330, that service instance can be readily switched under control of the service session manager 315 to another service host 330. At one level, the workload can be simply re-queued in work queue 420 for new assignment to the next available resource. In other words, the workload can be placed in the work queue for dispatch to the next available service instance 340, which might be made available because it had completed a previous workload dispatch, or might be made available in accordance with an assignment of additional resources as described below.

At a higher level of recovery management, additional resources can be made available to the service session manager 315 when one of its assigned service instance managers 335 going "offline." With the loss of the assigned service instance manager 335, the service session manager 315 might determine that it has a shortcoming in resources available for execution of the client application 311 and would accordingly communicate its need for additional resources to the resource conductor 410, which is then operable to determine if resources exist that will fulfill the request for additional resources.

As was the case with the initial provisioning or allocation of resources, the resource conductor 410 will seek to make an allocation of resources in accordance with the system policies as set forth in one or more service level agreements. Accordingly, the techniques described in the commonly owned patent application, "Method and system for utilizing a resource conductor to optimize resource management in a distributed computing environment," U.S. application Ser. No. 11/694,658, may be used in this context as well as for the initial resource provisioning. If the resource conductor 410 determines that additional resources are to be assigned according to the service level agreements, the resource conductor 410 will request those resources from the resource manager 305.

At a still-higher level of recovery management, because of the multiple layers of management that exist in the presently described architectures, recovery management is available also for the instance that the host running the service session manager 315 goes down. In that circumstance, the session director 325 would do substantially the same thing that the service session manager 315 did in the context above when the service instance manager 335 went down, except at one level higher in the architecture. More specifically, the session director 325 would detect that service session manager 315 is gone, and the session director 325 can then go to the resource manager 305 to seek to have a new service session manager 315 assigned. Meanwhile, the client API 312, which in many cases may have a direct, generally continual connection to the service session manager 315, can detect a failure of the service session manager 315 without going back to the end-user through the client application 311 and get new URL of new service session manager 315 that will be serving the application.

The persistent store 625 can be used in conjunction with the above-referenced failover techniques to further facilitate the new assignment or reassignment of run-time modules (e.g., 315, 335, 340) and resources (e.g., 330) without needing to return to the client application 311 for further instruction. Specifically, if the execution of a workload has been lost, the disclosed embodiments provide for accessing the submitted workload in the persistent store 625 and resubmitting that workload, such as by re-queuing it in the workload queue 420 of the service session manager 315 or queuing the workload in a newly assigned service session manager, in any case without returning to the client application 311 to ask again for that workload.

Above, a detailed description is provided for the failover mechanism for service instance managers 335; specifically, the failover mechanism is managed by the service session managers 315 in conjunction with the resource conductors 410 and the resource managers 305. At a higher level, the above description further sets forth the failover mechanism for service session managers 315, with this higher-level mechanism being managed by the client APIs 312 in conjunction with the resource conductors 410 and the resource manager 305. Further described above is the use of the persistent store 625 in enabling such failover management in an efficient and expedited manner.

In addition to the two higher levels of failover management described above, the service instance managers 335 can provide lower-level failover management with respect to the service instances 340 (comprising the service applications 342 and service APIs 344). And in addition to those levels of monitoring, the resource manager 305 is operable to monitor the operation of the various session directors 325 to ensure their continued operation.

To summarize the levels of monitoring and failover in a tabular format, from lowest level to highest level, generally speaking the monitoring and failover responsibilities are as follows:

SIMs 335—monitor service instances 340 and/or reinitiate service instances 340 based on configured policies for the SIM 335.

SSMs 315—monitor SIMs 335 and notify resource conductor 410 and resource manager 305 to reassign resources (e.g., 330) or reinitiate SIMs 335 and service instances 340.

SD—monitor SSM 315 and reinitiate SSM 315 and inform SSM 315 of the application that it was working for.

Client APIs 312—monitor SSMs 315 and requests to the SD 325 for new URL of SSMs 315.

Resource manager 305—monitor SDs and reinitiate SDs.

The monitoring is generally and specifically as described above. Monitoring techniques can be further described with respect to certain techniques described in commonly owned U.S. patent application Ser. No. 11/694,658, entitled "System for generic service management in a distributed and dynamic resource environment, providing constant service access to users," which is incorporated herein by reference. This application describes techniques that can operate from a service controller to monitor for application failures, but some of the monitoring techniques described therein could be employed advantageously by the disclosed network elements herein for monitoring the continued operation of the other network elements to which they are connected. Other useful monitoring techniques are described in commonly owned U.S. patent application Ser. No. 10/871,350, entitled "Autonomic monitoring in a grid environment," which is incorporated by reference herein.

With respect to the specific failover techniques employed, those follow the techniques previously described above for assignment, instantiation, and provisioning of service components and resources. Not only do the described techniques provide for efficient and invisible-to-the-user failure monitoring and failover, but they also provide for isolation between resources and service components such that the failure of one resource or service component only affects the limited applications and service instances with which they are associated.

In addition to the monitoring and failover handling of the resources and service components described above, the present system also provides, particularly with the persistent store 625 approaches, the ability to recover from failure of the client applications 311. If a client application 311 and/or client host 310 goes down, depending on the options set for the client application 311, the system 300 is able to continue to process the workloads sent from the client and place the workload outputs in the persistent store 625 until the client host/client application 310/311 comes back online. Specifically, in certain embodiments the service session manager 315 is able to detect that the client has gone offline and coordinate the storage of workload outputs in the persistent store 625, and once the service session manager detects that the client application has come back online the service session manager 315 is able to retrieve the application's workload outputs from the persistent store and queue them into the workload output queue 340 of the service session manager for delivery back to the client application 311.

Using the above-described techniques, a grid-enabled architecture can be implemented having no single point of failure in the system 300. There is monitoring available at every level, and failovers are provided in an efficient and expeditious manner, substantially without the fact of system resource or service component failures even being perceptible to system end-users. The isolation of applications between resources and service components further protects these failures from the perception of end-users, because if the any single item in the system 300 fails, that item only affects the application workloads that are actually being executed on it, and with the flexibly and efficient failovers, particularly when coupled with the persistent store mechanism, the fact of resource or service component failure can be substantially isolated and unknown to application end-users.

In particular, the level of independence that the various service components—the session directors 325, the service session managers 315, the service instance managers 335, the resource managers 305, the resource conductors 410 the persistent store 625—all provide various levels of operational independence from each other. Thus, the failure of any one of these service components only affects what the processes that the service component is handling. Further, with the eminently flexibly failover for these service components, the service execution of the system 300 can be preserved almost no matter the failures that may occur in the system 300 during operation. So-called "ripple effects" failures, which are often seen in prior-art systems, are avoided by the layered approach in which the workload management is decoupled from the resource management, and in which the peer service components operate independently from each other and in many cases separate from the "supervisory" service components that originally provisioned them.

Within the previously described embodiments there are many different features that can be implemented. The service instance manager 335, for example, can be configured to take different actions according to conditions of the service instance 340 operating on the service host 330, depending upon policy desires of the administrator or the users of the specific applications. As an example, should the service instance 340 fail for whatever reason, such as becoming hung up on the server 340, failing to return a response to an inquiry from the service instance manager 335, or otherwise becoming non-responsive, the service instance manager 335 could either attempt to restart or reinitiate the service instance 340. Under certain defined instances, for example, the service instance manager 335 could add the "hung" service instance 340 to a blacklist such that the particular service instance not be used anymore.

Other possible policy implementations might include limits on how long a service instance 340 could operate on the service host 330 without being restarted, such that after a certain period of time the service instance manager 335 could be made to restart the service instance 340 gracefully. Another possible limitation would be if the service process image size exceeds memory limits such as perhaps 1.5 GB. The above are examples of various types of parameters and policies that can be placed upon the operation of the service instance on a host and any number of different parameters could be defined and any number of different disposition instructions could be defined for the operation of the service instance 340 depending on systems design needs.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, in the instance that any elements of the systems described in the present application are located on common hosts, then the communications between those elements could then be through internal host protocols. In other words, in those instances the host would manage the various software modules operating thereon using normal work management protocols within the host. Connections between network elements, and the operation of certain network elements, can be implemented on and monitored by software daemons, which are processes that are normally responsible in computer systems for handling things like responding to network requests or monitoring hardware activity. The labels applied to the various software processes are not dispositive, however, to whether the claims cover those process elements.

While specific local-area network or wide-area network communication protocols may be described herein, the coverage of the present application and any patents issuing therefrom may extend to other networks operating using other communications protocols. Systems using protocols presently known in the industry and later-developed protocols may be covered according to the claims at the end of this document and equivalent elements to the elements claimed.

In the context of this application, resources may encompass any types of resources that are necessary for running such applications, including hardware (such as servers, clients, mainframe computers, networks, network storage, databases, memory, central processing unit (CPU) time, scientific instruments and other computing devices), as well as software, software licenses, available network services and other non-hardware resources. There are also many different phrases that refer generally to computing grid systems, and those alternative phrases are also envisioned as being encompassed within the scope of the claims. Such alternative phrases include distributed computing environments or distributed computing networks or systems. Generally speaking, such distributed computing environments include hardware and software infrastructure configured to form a virtual organization comprised of multiple resources, which resources may be in geographically disperse locations.

Policies and service level agreements described herein can apply to different consuming entities, including different users, user groups, organizations, departments, business units, queues, projects, and applications. Services and applications are described in this application using those alternative terms. A service/application is a program that traditionally has run on a single host in isolation. Examples of such a service may CAD/CAM services, financial analysis services, and database analysis services. By use of the system disclosed herein, such individual services may be run effectively and efficiently on multiple hosts in a distributed computing environment. In the context of a distributed computing environment, such services are considered to be transportable in that they may be run on multiple hosts and/or migrated from one host to another.

Various terms used herein have special meanings within the present technical field. Whether a particular term should be construed as such a "term of art," depends on the context in which that term is used. "Know" or "known" refers to a computer state of a certain fact or condition being stored in the referenced process, whether that fact or condition was received from another process separate from the referenced process or determined by computations within the referenced process. "Offline" and "online" refer to a referenced process being active or not active in communications to other processes. This state of activity or inactivity can be by system or process failure, or by system or process intention whereby the referenced process was inactivated as a part of the process "Connected to," "in communication with," or other similar terms should generally be construed broadly to include situations both where such connections or communications are direct between two referenced elements or through one or more intermediaries between the referenced elements. "Network," "system," and "architecture" within the present application generally refer to distributed computing systems that embody one or more inventive aspects of the present disclosure. These and other terms are to be construed in light of the context in which they are used in the present disclosure and as those terms would be understood by one of ordinary skill in the art would understand those terms used in the disclosed contexts. In the context of the present disclosure, the terms "sending," "transmitting," "interfacing" and "communicating" can all comprise similar or different types of electronic communication, including optical communication, depending on the context in which those terms are used. The above definitions are not meant to be exclusive of other meanings that might be imparted to those terms based on the contexts herein.

Words of comparison, measurement, and timing should be understood to not be absolute, but to be of the appropriate relative dimension, measurement, and timing to accomplish the implicitly or expressly stated desired result. Thus, these words of comparison, measurement, and timing such as "equal to," "less than," "during," and the like, should be understood to mean "substantially equal to," "substantially less than," and "substantially during," where "substantially" meaning such comparisons, measurements, and timings as are practicable to accomplish the implicitly or expressly stated desired results.

The software applications described in the present embodiments may be provided in through computer-based electronic transmissions or on CDs, DVDs, or other physical media. The run-time modules and specific operating instances in particular may be transmitted through electronic communications and stored for execution on various client, service and middleware host servers in the systems described. Service instance can communicate through the described network-based communications protocols or through shared memory space, such as the case when software modules are linked together and compiled to form commonly operating software modules. Described software development kits can also be provided as operating code modules and/or source or object code on physical media or transmitted through electronic means.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A service manager installed on one or more computing devices for operation in a distributed computing system, the distributed computing system for receiving workloads from one or more client applications and executing those workloads on one or more service instances running on one or more service hosts within the distributed computing system, wherein the distributed computing system dynamically assigns the service hosts and initiates the service instances on the service hosts according to the service needs and the availability of such service hosts and service instances, the service manager comprising:
   a) a workload input interface operable to receive workloads associated with an application from one or more clients for execution on the distributed computing system, wherein the one or more clients received address information of the service manager from a session director in response to an assignment request for the application from the one or more clients;
   b) a resource management interface operable to receive information from a resource manager identifying the available service hosts or service instances for computing the received workloads from the one or more clients, and wherein the resource manager and the service manager continue to operate if the session director fails;
   c) a workload output interface operable to send workloads to the one or more hosts or service instances;
   d) wherein at least one of the workload input interface, the resource management interface, and the workload output interface is a binary communications interface whereby the service manager is operable to communicate workloads with other elements of the distributed computing system that are directly or indirectly connected through that at least one interface using a binary communications protocol.

2. The service manager according to claim 1, wherein the workload output interface is further operable to receive workload results back from the service instances to which the workloads had been sent for execution.

3. The service manager according to claim 2, wherein the workload input interface is further operable to communicate the received workload results back to the client applications from which the workloads had been received.

4. The service manager according to claim 3, and further comprising a persistent store interface, the persistent store interface providing a binary communications interface for persistently storing the workloads received in the service manager and sent to the service instances and for persistently storing the workload results received from the service instances and sent back to the client applications.

5. The service manager according to claim 4, wherein the persistent store interface is the same interface as the workload output interface.

6. The service manager according to claim 5, wherein the persistent storage of the workloads and workload results is initiated substantially at the same time as the respective workloads are sent to the service instances for execution and workload results are sent to client applications.

7. The service manager according to claim 1 and further comprising a persistent store interface, the persistent store interface providing a binary communications interface for persistently storing the workloads received at the service manager.

8. The service manager according to claim 7, wherein the persistent storage of the workloads is initiated substantially at the same time as the workloads are sent to the service instances for execution.

9. The service manager according to claim 1, wherein the resource management interface is operable to communicate indirectly with resources within the distributed computing system by communicating with a resource manager, where the resource manager is responsible for determining the resources to be made available for operating workloads that have been sent to the service manager.

10. The service manager according to claim 1, wherein the service manager further comprises a resource conductor component, wherein the resource conductor component is operable to apply defined service level agreements and to balance the resources indicated as available through the resource management interface and the workloads sent to the service manager through the workload input interface.

11. The service manager according to claim 10, wherein the service manager further comprises a service session manager component in addition to the resource conductor component, and wherein the service session manager component and the resource conductor component are collectively operable to provide two-level resource scheduling in which the resource conductor balances the workload service needs against the available resources to make a top-level assignment of resources to the service session manager and wherein the service session manager component makes the assignments of workloads for execution on the resources that have been assigned to it.

12. The service manager according to claim 11, wherein the service session manager component communicates its resource needs to the resource conductor component by sending summary information to the resource manager.

13. The service manager according to claim 11, wherein the service session manager component communicates its resource needs to the resource manager by sending workloads to the resource conductor component for analysis.

14. The service manager according to claim 1, wherein the resource management interface is a binary communications interface whereby the service manager is operable to communicate directly or indirectly with resources that are available to it using a binary communications protocol, the service manager further operable to assign a resource without having to receive HTTP-protocol commands from the resource to know the resource's availability.

15. The service manager according to claim 1, wherein the service manager is further operable to monitor the operation of the service instances for failures in execution, and whereby the service manager is operable to re-queue the failed workloads to the failed service instances or to queue the workloads to other service instances that are available to the service manager.

16. The service manager according to claim 15, wherein the service manager further comprises a persistent store interface, wherein the service manager is operable to retrieve from persistent store the workloads corresponding to the failed workloads without going back to the client applications that originally had submitted the failed workloads.

17. The service manager according to claim 1, wherein the binary communications interface is a synchronous binary interface.

18. The service manager according to claim 1, wherein the binary communications interface is an asynchronous binary interface.

19. A method of managing services in a service-oriented architecture distributed computing system, the method comprising:
at a session director, receiving an assignment request from one or more clients to execute an application;
at the session director, sending at least one address of a service manager operable to manage workloads for the application;
in the service manager, receiving workloads for the application from the one or more clients through a binary interface of the service manager;
in the service manager, seeking available service instances within the distributed computing system to process the workloads;
from the service manager, initiating a request to a resource manager to establish additional available service instances to process the workloads if the service manager does not presently have access to available service instances having the necessary capacity, and wherein the resource manager and the service manager continue to operate if the session director fails; and
from the service manager, sending the workloads through the binary interface of the service manager to one or more service instances running on one or more service hosts within the distributed computing system.

20. The method according to claim 19, and further comprising the service manager interfacing with a resource manager to determine whether and what service instances are available to process the workloads.

21. The method according to claim 19, and further comprising receiving workload results in the service manager and transmitting those workload results to the client applications that sent the respective workloads.

22. The method according to claim 19, and further comprising sending the received workloads from the service manager to a persistent store substantially at the same time that the service manager sends the received workloads to the service instances for execution.

23. The method according to claim 20, and further comprising a first level of resource scheduling by the service manager's interfacing with the resource manager to get an initial assignment of available service instances through a resource conductor component within the service manager and a second level of resource scheduling by the service manager's continued management of the sending of workloads to available and assigned service instances.

24. The method according to claim 19, wherein the service manager communicates with the service instances through a substantially continual binary communications interface, whereby the service manager is operable to communicate directly or indirectly with the service instances and is further operable to assign a service instance without having to receive HTTP protocol commands from the service instance to know the service instance's availability.

25. The method according to claim 19, further comprising the service manager monitoring the operation of the service instances for failures in execution and further comprising the service manager re-queuing failed workloads to the failed service instances or queue the workloads to other operational service instances that are available to the service manager.

26. The service manager according to claim 25, further comprising the service manager retrieving the workloads corresponding to the failed workloads from a persistent store without going back to the client applications that originally had submitted the failed workloads.

27. A method of providing a grid-enabled, service-oriented system, the method comprising:
  providing client application software containing instructions operable to submit assignment requests for an application from one or more clients and application workloads to the system;
  providing session manager software containing instructions operable to receive the assignment requests and instructions operable to send one or more addresses of one or more service managers operable to manage the application workloads, wherein the one or more clients can receive address information of the service manager from a session director in response to an assignment request for the application from the one or more clients;
  providing service manager software containing instructions operable to receive the application workloads and instructions operable to communicate directly or indirectly with service hosts on the system;
  providing resource management software containing instructions operable to allocate service hosts to the one or more service managers to execute the submitted workloads; wherein the resource manager and the service manager continue to operate if the session director fails; and
  providing service host application software containing instructions operable to receive the workloads directly or indirectly from operating instances of the service manager software;
  wherein at least one of the client application software instructions, the service manager software instructions, the resource management software instructions, and the service host software instructions contain instructions for operating a network communications interface that communicates workloads using binary communications protocols.

* * * * *